United States Patent
Bottero et al.

(10) Patent No.: US 9,168,681 B2
(45) Date of Patent: Oct. 27, 2015

(54) METHOD FOR MAKING HOLLOW STIFFENING ELEMENTS

(75) Inventors: Luca Bottero, Olgiate Olona (IT); Gianni Duccini, Forte dei Marmi (IT); Massimo Gregori, Tradate (IT); Alberto Midali, Sesto Calende (IT)

(73) Assignee: ALENIA AERMACCHI S.P.A., Venegono Superiore (VA) (IT)

( * ) Notice: Subject to any disclaimer, the term of this patent is extended or adjusted under 35 U.S.C. 154(b) by 212 days.

(21) Appl. No.: 13/179,224

(22) Filed: Jul. 8, 2011

(65) Prior Publication Data

US 2012/0006477 A1    Jan. 12, 2012

(30) Foreign Application Priority Data

Jul. 9, 2010   (IT) .............................. TO2010A0597

(51) Int. Cl.
| | |
|---|---|
| *B29C 70/30* | (2006.01) |
| *B29C 33/68* | (2006.01) |
| *B29C 33/56* | (2006.01) |
| *B29C 70/50* | (2006.01) |
| *B29D 99/00* | (2010.01) |
| *B29C 61/02* | (2006.01) |
| *B29C 63/42* | (2006.01) |

(52) U.S. Cl.
CPC ................ *B29C 33/68* (2013.01); *B29C 33/56* (2013.01); *B29C 70/504* (2013.01); *B29D 99/0014* (2013.01); *B29C 61/02* (2013.01); *B29C 63/42* (2013.01)

(58) Field of Classification Search
CPC ........ B29C 33/56; B29C 33/68; B29C 61/02; B29C 63/42; B29C 70/504

USPC .......................................................... 156/246
See application file for complete search history.

(56) References Cited

U.S. PATENT DOCUMENTS

| | | | | |
|---|---|---|---|---|
| 3,576,387 | A | * | 4/1971 | Derby .............................. 174/36 |
| 3,795,559 | A | * | 3/1974 | Horn et al. ..................... 156/152 |
| 4,318,954 | A | * | 3/1982 | Jensen ........................... 174/255 |
| 4,388,263 | A | * | 6/1983 | Prunty .......................... 264/257 |
| 5,454,895 | A | * | 10/1995 | Imparato ....................... 156/156 |
| 6,071,591 | A | | 6/2000 | Dausch |
| 2010/0139857 | A1 | | 6/2010 | Pham et al. |

FOREIGN PATENT DOCUMENTS

| | | | |
|---|---|---|---|
| GB | 842815 | * | 7/1958 |
| GB | 842815 |   | 7/1960 |

OTHER PUBLICATIONS

Italian Search Report for Application No. TO20100597 mailed Mar. 9, 2011.

* cited by examiner

*Primary Examiner* — Philip Tucker
*Assistant Examiner* — Vicki Wu
(74) *Attorney, Agent, or Firm* — Merchant & Gould P.C.

(57) ABSTRACT

A method for making hollow stiffening elements with co-curing technique on a structure made of composite material 1 includes the use of at least a lamination and polymerization spindle 2 upon which is positioned at least a rolled section 3. The rolled section 3 forms at least a hollow structure 11 where there is the spindle 2, including the following operational phases: coating the spindle 2 with at least a first anti-adherent layer 41; coating the spindle 2 with at least a second heat-shrinking layer 42; heating the coated spindle 2; positioning the spindle 2 on the surface of the structure 1; laminating the surface 1 through at least a rolled section 3; heating the structure 1 with at least a positioned rolled section 3; extracting the spindle 2 from the hollow structure 11.

6 Claims, 2 Drawing Sheets

METHOD FOR MAKING HOLLOW STIFFENING ELEMENTS

This application claims benefit of Serial No. TO 2010 A 000597, filed 9 Jul. 2010 in Italy and which application is incorporated herein by reference. To the extent appropriate, a claim of priority is made to the above disclosed application.

BACKGROUND

The present invention refers to a method for making stiffening elements, made by co-curing technique, for structures made of composite material, comprising at least a hollow section.

The co-curing or co-polymerization technique is able to entirely polymerize some parts of structures made of composite material in a sole polymerization cycle.

There are known processes of production of structures made of composite material wherein lamination spindles are used. These structures are normally made in polymeric material and are used for the making of rigid panels comprising hollow elements.

These spindles are arranged on the structure for being covered by rolled sections, normally made of carbon, which determine the stiffening of this structure.

In this solution, the spindle enters in direct contact with the rolled sections, used for the stiffening of the structure, both during the posing and during the stiffening phase, normally in autoclave.

With this method, it is then really difficult the extraction of the spindle from the hollow elements after the heating of the structure, causing also high costs for the cleaning of the hollow elements made in this way.

Furthermore, the contact between the spindle and the rolled section can cause a contamination of the rolled section itself, which can vary its physical and structural characteristics causing a reduction of the performances of the rolled section in relation to the stiffening.

A further drawback of the known art is related to the impossibility of moving the spindle after the posing of the rolled sections on the structure made of composite material, because the polymeric material of the spindle usually creates a high coefficient of friction with the rolled section.

SUMMARY

The present invention proposes itself to solve the above mentioned drawbacks by implementing a new and innovative method for making these structures stiffened with hollow elements covering the spindle with layers of anti-adherent material in such a way as to avoid contaminations of the rolled sections by the spindle.

Furthermore, this method permits to move the spindle during the posing of the rolled sections and facilitates the extraction of the spindle from the hollow elements once the realization phase of this stiffened structure is ended.

The method, according to the present invention, permits the reduction of the realization time of these structures, consequently reducing the costs due to the cleaning of the hollow elements, present in the known art.

BRIEF DESCRIPTION OF THE DRAWINGS

The characteristics and the advantages of this method will be better clear and evident from the following description of an embodiment with reference to the attached figures, which show specifically.

DETAILED DESCRIPTION

Figure 1:
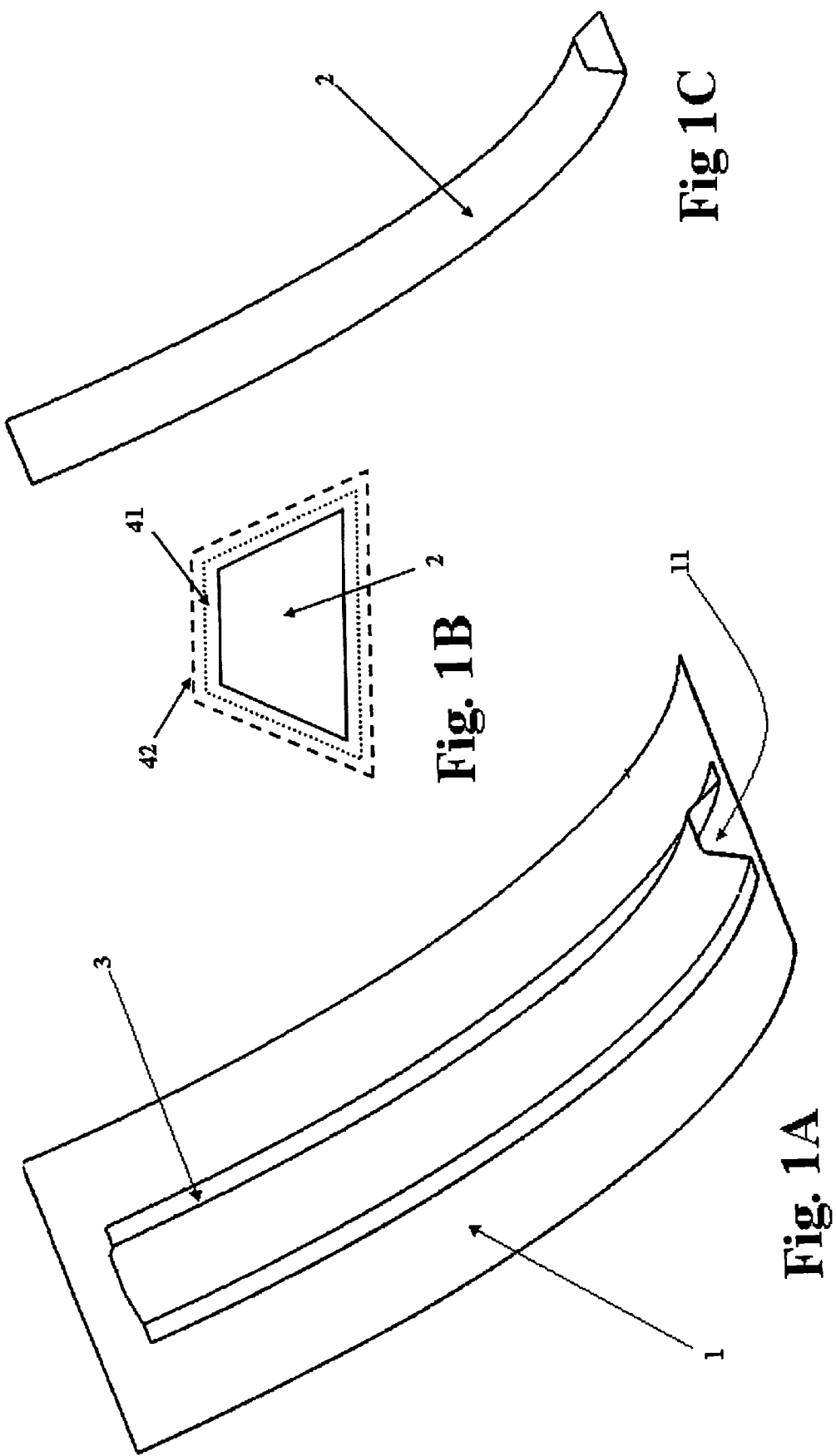
FIGS. 1A, 1B and 1C show respectively, FIG. 1A a structure comprising a stiffening element realized with the method according to the present invention seen in a perspective view, FIG. 1B the spindle seen in sectional view realized according to the present invention and 1C shows the spindle in a perspective view.

With reference to the abovementioned figures, the method for making hollow elements with co-curing technique on a structure in composite material 1 comprising the use of at least a lamination and polymerization spindle 2 upon which it is positioned at least a rolled section 3 which is able to stiffen structure 1 and to form at least a hollow structure 11 where there is spindle 2, which will be extracted from hollow structure 11 at the end of the making of the stiffening element.

This method is characterized in that it comprises the following operating phases:
a) coating spindle 2 with at least a first anti-adherent layer 41;
b) coating spindle 2 with at least a second heat-shrinking layer 42;
c) heating coated spindle 2;
d) positioning spindle 2 on the surface of structure 1;
e) laminating surface 1 through at least a rolled section 3;
f) heating structure 1 with at least a positioned rolled section 3;
g) extracting spindle 2 from the hollow structure 11.

Spindle 2 is made preferably in polymeric material with high thermal expansion coefficient, with respect to the thermal expansion coefficient of rolled sections 3, for facilitating the extraction of hollow structure 11.

The shape of said spindle 2 in the following embodiment has a trapezoidal transversal section.

Before the laying of spindle 2 on structure 1, it is carried out the above described phase "a": coating spindle 2 with at least a first anti-adherent layer 41. Said layer is preferably a polymeric film, which is for example in tubular shape, which is preferably fitted around whole spindle 2.

Inserted said first layer 41, there is the following phase "b": coating spindle 2 with at least a second heat-shrinking layer 42.

Second layer 42 is preferably a polymeric heat-shrinking layer, for example in tubular shape, which is preferably fitted around the whole spindle 2.

After having positioned these coatings on spindle 2, there is phase "c": heating coated spindle 2. Said heating enables the activation of heat-shrinking of layer 42. This operation needs an adapted homogeneous heating source according to the type of the used polymer. Second layer 42, owing to this temperature increasing, correctly adheres to spindle 2, compressing also the underlying first layer 41.

Said shrinking of second layer 42 permits that the shape of spindle 2 keeps remaining unmodified and hollow structure 11 which will be made successively will have a correct shape according to the realization specifications.

Both first anti-adherent layer 41 and second anti-adherent layer 42 are adapted to insulate spindle 2 from rolled sections 3 avoiding contaminations.

First anti-adherent layer 41 and second anti-adherent heat-shrinking layer 42 are in such a way as to generate between them a very low friction coefficient.

After phase "c" is ended up, there is phase "d": positioning spindle 2 on the surface of structure 1.

Said structure 1 is preferably in composite material upon which the hollow stiffener is to be made.

The posing of said spindle 2 on structure 1 occurs where hollow structure 11 has to be made in the part which will be stiffened.

Figure 2:
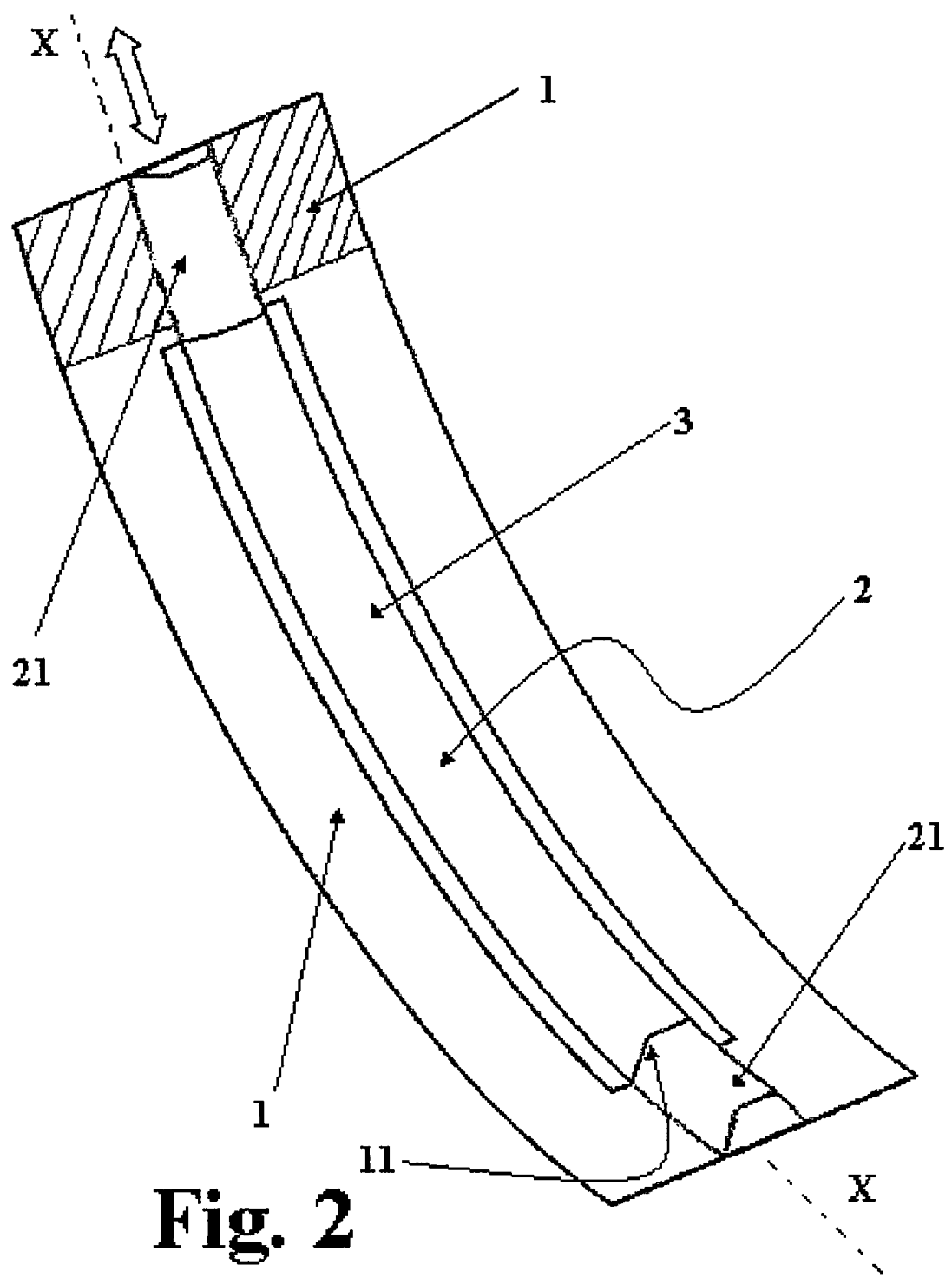
FIG. 2 shows the spindle applied to a structure wherein it is applied a stiffening element with a hollow one in a perspective view of the structure.

Once spindles 2 are positioned in the positions wherein hollow structure 11 is to be made, there is phase "e": laminating surface 1 through at least a rolled section 3. Spindle 2 has longitudinal length higher than the laminated zone in such a way as to expose at least an exposed portion 21 outside of the profile of rolled section 3 as shown in FIG. 2.

Once rolled sections 3 are positioned, it is possible to move said spindle 2 by taking it from exposed portions 21.

The movement is permitted by the friction coefficient between first layer 41 and second layer 42. As a matter of fact, first layer 41 moves integrally with spindle 2, whereas second layer 42 remains in position in contact with rolled section 3 just positioned, permitting the movement of spindle 2 along its longitudinal axis "X".

Said characteristic permits to insert layers of rolled section 3 also under exposed portions 21 of spindle 2 realizing thus hollow structures 11 only in the interested predetermined zones and to avoid discontinuity zones between rolled sections 3, positioned above structure 1, in proximity of hollow elements 11 also in presence of spindle 2.

Once various rolled sections 3 are positioned in such a way as to cover structure 1 where a stiffening of structure 1 itself is to be obtained, there is phase "f": heating structure 1 with at least a rolled section 3.

Said structure 1 is polymerized according to a thermobaric cycle specific for the matrix used, usually with the use of an autoclave such that rolled sections 3 correctly adhere to structure 1 stiffening themselves.

During this heating spindle 2, with high dilatation coefficient, dilates before the heating stiffens rolled sections 3, in such a way as to extend the size of hollow structure 11, keeping anyway the size indicated in the realization specifications.

The expansion of spindle 2 is limited by the stiffening of rolled sections 3 thus locking the size of hollow structures 11.

The cooling following phase "f" causes the contraction of said spindle 2.

Once the abovementioned phase "f" is ended, there is the last phase for making these elements that is phase "g": extracting spindle 2 from the hollow structure.

This constriction of spindle 2 enables the correct extraction of it without contamination problems for the direct contact with rolled sections 3, thanks to first layer 41 and second layer 42 both anti-adherent.

Exposed portions 21 of spindle 2, remained outside of to hollow structure 11, are suitable for its extraction, because they carry out a handle function upon which the responsible operator can hold for the extraction of spindle 2 itself.

The present method for making hollow stiffening elements is stable in its realization and easy because it does not require the use of other devices with respect to the method implemented in the known art and, furthermore, costs are reduced because the cleaning of hollow structure 11 caused by a contamination of rolled section 3 by spindle 2 is eliminated. It is also possible to move spindle 2 thus reducing the number of spindles 2 necessary for making a structure 1 with very extended stiffened area.

The invention claimed is:

1. A method for making hollow stiffening elements with co-curing technique on a structure made of composite material comprising the use of at least a lamination and polymerization spindle upon which is positioned at least one rolled section; the spindle having a longitudinal length greater with respect to the at least one rolled section to expose at least an exposed portion outside of a profile of the rolled section for movement of the spindle;
   said rolled section forms at least a hollow structure where the spindle is located;
   said method comprising the following operational phases:
   a) coating the spindle with at least an anti-adherent first layer;
   b) coating the spindle with at least a heat-shrinking second layer;
   c) heating the coated spindle to adhere said anti-adherent first layer and said heat shrinking second layer to said spindle, to attain a lower coefficient of friction between said anti-adherent first layer and said heat-shrinking second layer;
   d) positioning the spindle on the surface of the structure;
   e) laminating the surface through one of the at least at least one rolled section and forming the hollow structure on the spindle;
   f) moving the spindle along a longitudinal axis by taking the spindle from the exposed portions, wherein the anti-adherent first layer moves integrally with the spindle, and wherein the heat-shrinking second layer remains in a position in contact with the at least one rolled section, wherein the spindle is moveable along the longitudinal axis;
   g) inserting layers of the at least one rolled section under the exposed portions of the spindle out of the profile of the at least one rolled section positioned in step e);
   h) heating the structure obtained in steps a) though g); and
   i) extracting the spindle from the hollow structure by taking the spindle from the exposed portions.

2. The method according to claim 1, wherein the anti-adherent first layer is a polymeric film fitted all around the spindle, for insulating the spindle from the rolled sections.

3. The method according to claim 1, wherein the heat-shrinking second layer is a heat-shrinking polymeric film fitted all around the spindle, for insulating the spindle from the rolled sections.

4. The method according to claim 3, wherein the second layer adheres to the spindle, pressing the first layer when said coated spindle is subjected to an increase of temperature.

5. The method according to claim 1, wherein the spindle is a polymeric material with coefficient of thermal expansion higher with respect to the coefficient of expansion of the rolled sections for facilitating extraction of said spindle from the hollow structure.

6. The method according to claim 1, wherein the layers of the at least one rolled section are positioned orthogonally with respect to the longitudinal axis of the spindle.

* * * * *